Sept. 3, 1946.　　　E. A. STALKER　　　2,406,918
WING
Filed Jan. 15, 1940　　　4 Sheets-Sheet 1
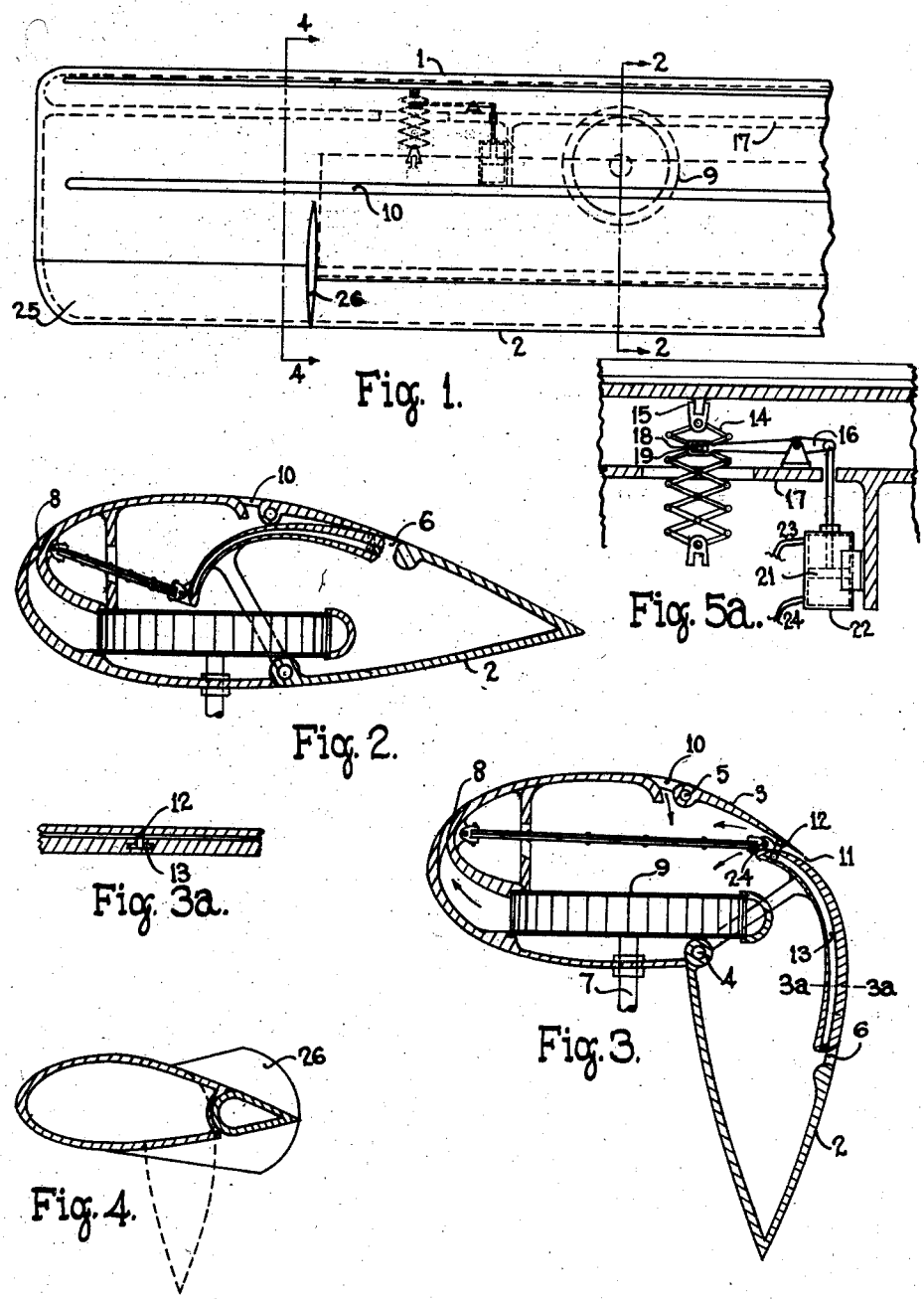
INVENTOR
Edward A Stalker INVENTOR.
Edward A. Stalker Sept. 3, 1946.  E. A. STALKER  2,406,918
WING
Filed Jan. 15, 1940  4 Sheets-Sheet 3

INVENTOR.
Edward A. Stalker

Sept. 3, 1946.　　　E. A. STALKER　　　2,406,918
WING
Filed Jan. 15, 1940　　　4 Sheets-Sheet 4

INVENTOR.
Edward A. Stalker

Patented Sept. 3, 1946

2,406,918

UNITED STATES PATENT OFFICE 2,406,918

WING

Edward A. Stalker, Ann Arbor, Mich.

Application January 15, 1940, Serial No. 313,967

13 Claims. (Cl. 244—42)

My invention relates to wings and particularly wings employing boundary layer control, and the objects of my invention are first to provide a means of increasing the lifting capacity of wings by slots employed with a specially shaped wing; second to provide a wing with a variable area and means to control the boundary layer; third to provide mechanism particularly adapted to the manipulation of the movable portions of the wing; fourth to provide a wing adapted for efficient lateral control.

I attain these objects by the means illustrated in the accompanying drawings in which—

Figure 1 is a fragmentary top plan view of a wing;

Figure 2 is a section along the line 2—2 in Figure 1;

Figure 3 is a section along the line 2—2 in Figure 1 with the flap deflected;

Figure 3a is a fragmentary spanwise section along the line 3a—3a in Figure 3;

Figure 4 is a fragmentary section along the line 4—4 in Figure 1;

Figure 5a is a fragmentary plan section of the wing in Figure 1 to show the lever mechanism;

Figure 5:
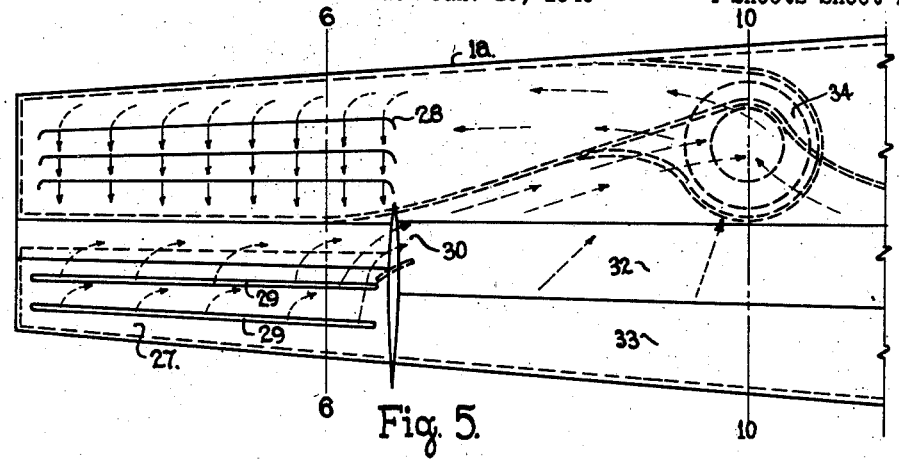
Figure 5 is a fragmentary top plan view of another wing.
Figure 6:
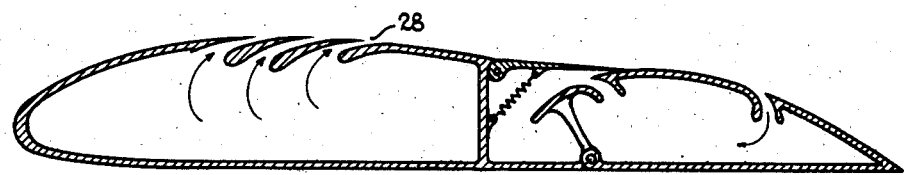
Figure 6 is a section along line 6—6 in Figure 1.
Figure 7:
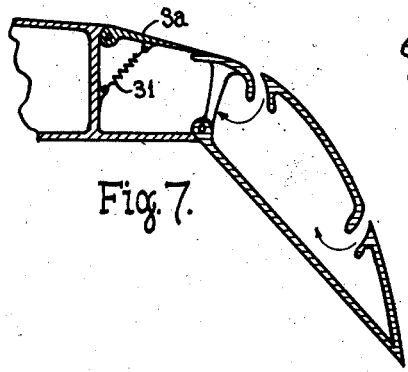
Figure 7 is a fragmentary section along line 6—6 in Figure 1 with the flap deflected.

I have shown in my U. S. Patent No. 1,913,644 how the induction and discharge of fluid through slots in the surface of a wing can increase the maximum lifting capacity. The present application discloses means to increase the effectiveness of wings employing slots.

For high speed it is desirable to use a relatively thin wing of very little or no arching of the mean camber line, but for high lifting capacity it is desirable to have a high arching of the mean camber line. With a thin wing and the conventional flap it is difficult to achieve a high arching and an upper surface free of abrupt changes of curvature. The present invention provides generously curved upper surfaces with a high value of the maximum ordinate of the mean camber line.

In Figures 1 to 5a is shown the means of cambering the wing with a special type of flap whereby a wing section of smooth curvature is obtained.

The wing is 1 and the wing flap is 2, the auxiliary flap is 3. The main flap 2 is pivoted at 4 and the auxiliary at 5.

In the high speed attitude shown in Figure 2, the auxiliary flap closes the induction slots 6 in the wing surface. The wing also has the discharge slot 8 through which air is ejected by the blower 9 which inducts air through the slot 10. With the flap depressed as shown in Figure 3 air is inducted also from the slots 6 and 11.

The flap 3 carries a group of T-shaped lugs 12 which slide in a slot 13 of the flap 2. When it is depressed there is a slot 11 formed between the surface of flap 2 and the auxiliary flap 3.

As shown in Figures 1 and 5a particularly the flap is moved by the multiple lever device 14 which is hinged to the wing at 15. The device is moved by the arm 16 which is pivotally supported on the spar 17. The arm is operably connected to 14 by means of a lug 18 which projects through the slot 19 in the arm 16 which is rotated by the action of the piston 21 in the cylinder 22. Fluid pressure is conveyed to the cylinder through the tubes 23 and 24 and the direction of flow is controlled by a valve in the cabin of the aircraft (not shown).

A small movement of the lug 18 causes a large movement of the end of the lever device which is attached to the flap at 24.

Thus the problem of obtaining a large flap travel with a small control motion is solved and a flap is provided which preserves a smooth contour to the wing even when it is depressed through a great angle.

The aileron is 25 and is operable in the usual manner. Its inner end is shielded by the shield 26 so that the flow is across the aileron chordwise even when the flap 2 is depressed. Without the shield there would be a flow spanwise along the aileron into the low pressure area above the flap 2 when it is depressed and this would reduce the effectiveness of both.

It is to be noted that the flap in the retracted position provides for the covering of the slot 6 so that a smooth wing surface is available for high speed flight.

It is also to be noted that the curved forward portion of the flap is important in providing a generously curved upper contour of the wing when the flap is depressed.

In the preferred form of the invention shown in Figures 5 to 7 and 9 to 11 the aileron is a flap 27 of the type described and ahead of it is a series of discharge slots 28 which are served with fluid by the blower 34. The aileron has the induction slots 29 in its surface in communication with the blower inlet by means of the duct 30.

Figure 8:
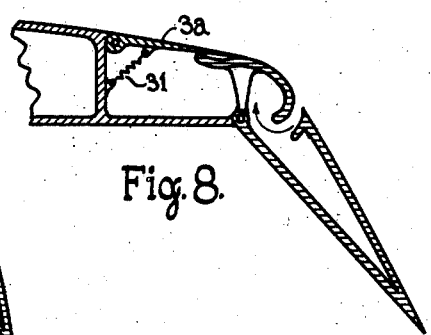
Figure 8 is similar to Figure 7 to illustrate an unsatisfactory form of flap.
Figure 14:
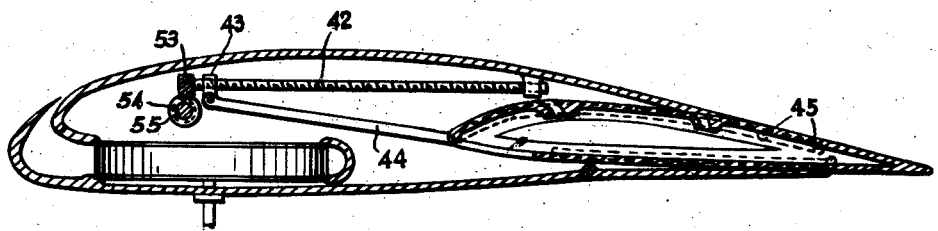
Figure 14 is a section along line 14—14 in Figure 12.

The aileron is thicker than the portion of the wing immediately ahead to provide a well rounded upper surface when the aileron is depressed. The additional thickness provides a greater radius of curvature as may be seen from a comparison of Figures 7 and 8. The aileron of the latter figure has the thickness of the normal wing section.

The auxiliary flap 3a is held against the aileron by the spring 31.

Figure 10:
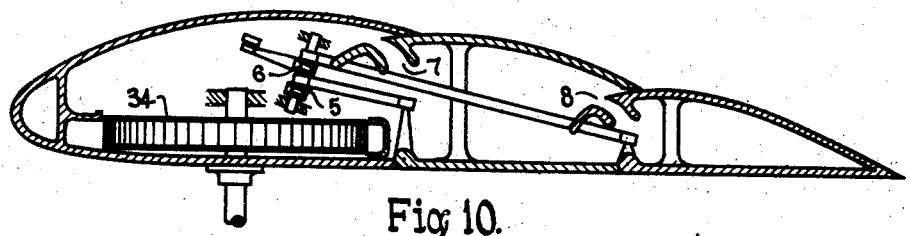
Figure 10 is a section along the line 10—10 in Figure 5.
Figure 11:
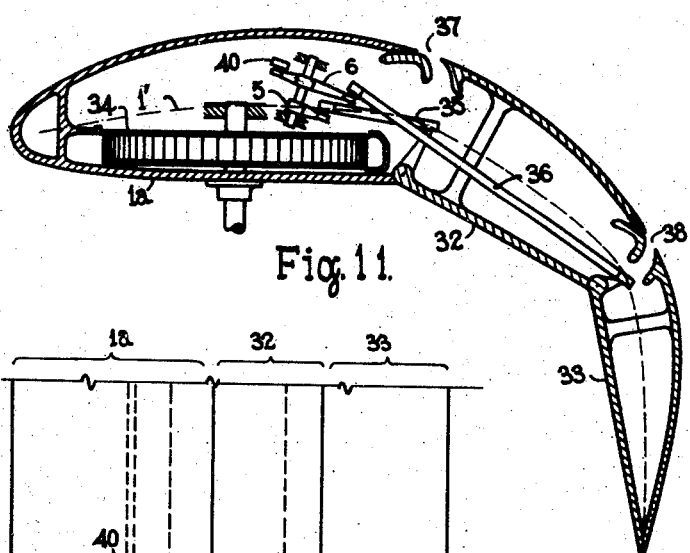
Figure 11 is a section along line 10—10 in Figure 5 with the flap deflected.
Figure 9:
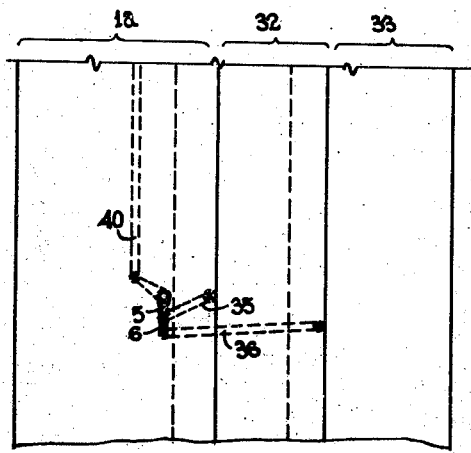
Figure 9 is a fragmentary top plan view of the preferred wing.
Figure 15:
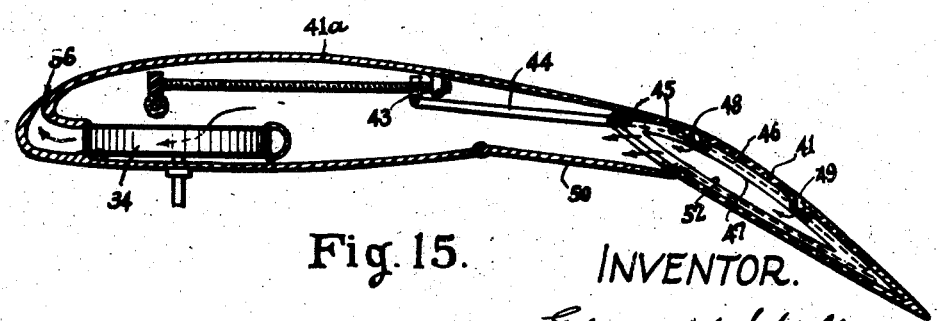
Figure 15 is a section along the line 15—15 in Figure 13.
Figures 12, 13:
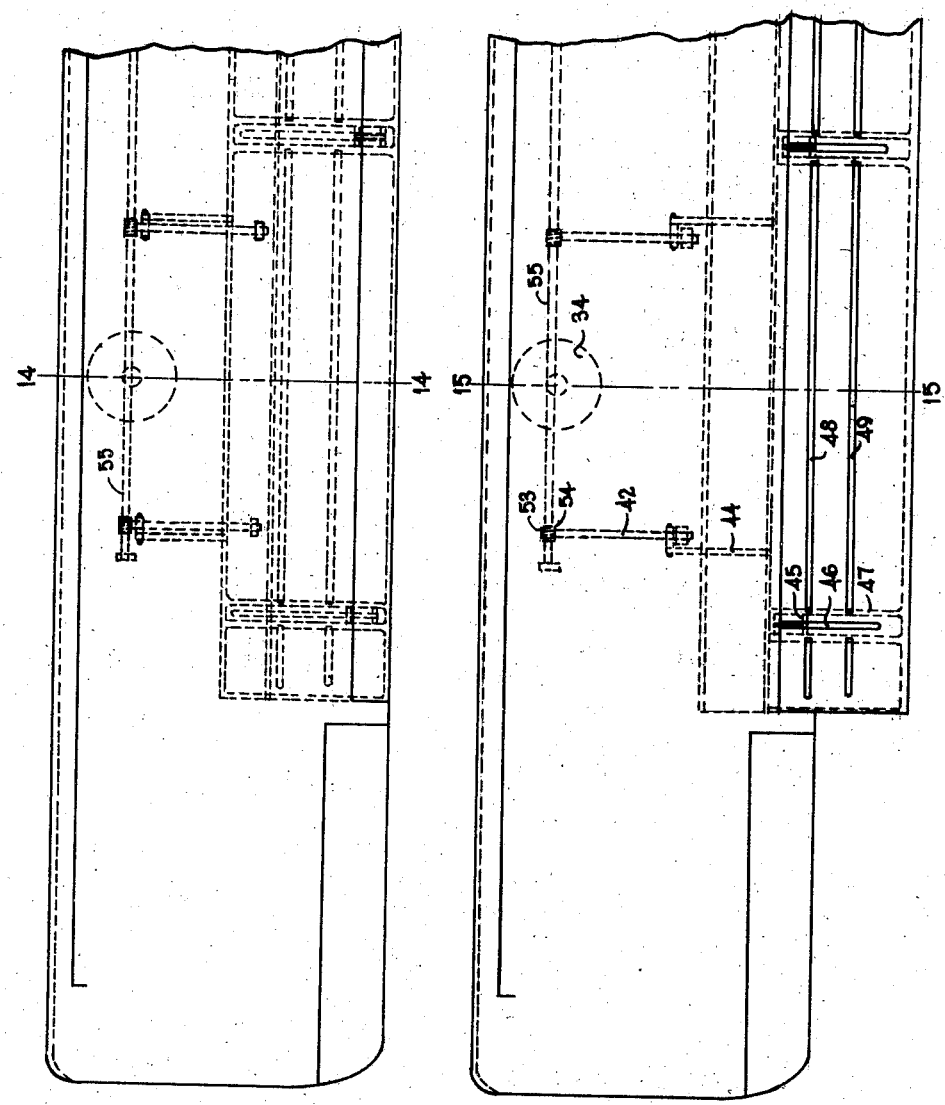
Figure 12 is still another form of the invention shown in top plan view.
Figure 13 shows the wing of Figure 12 with the auxiliary wing extended.

The wing also has lift augmenting flaps 32 and 33, Figures 5, 10 and 11. By providing two flaps the upper surface is given a still rounder contour to reduce the power required by the blower 34.

The flaps are rotated by means of connecting rods 35 and 36 actuated by the cranks 5 and 6. A push rod 40 leads from the bell crank 6 to a pilot's control.

The flaps 32 and 33 have an induction slot 37 and 38, respectively, which are in communication with the inlet of the blower 34 as shown in Figures 5 and 10.

In still another form of the invention the flap is both rotated downward and extended rearward as shown in Figures 12 to 15.

The wing is 41a and the flap is 41. Normally the flap is housed within the wing and is slid rearward by the screws 42, nut 43, and connecting rod 44. The wing carries two T-shaped lugs 45 which are situated in a groove 46 in the top of the flap and formed in the rib 47. The construction is similar to that shown in Figure 3a.

The flap has the two slots 48 and 49 which are exposed when it is extended. When it is retracted the slots are of course closed or shielded by the upper surface of the wing.

There is a lower surface flap 50 hinged at 51 with its outer end borne by a lug projecting into a chordwise groove formed in the rib 52.

The flap is slid rearward by the rotation of the screws 42 turned by the helical gears 53 and 54, the latter on the spanwise extending shaft 55.

The blower 34 draws the air into slots 48 and 49 and discharges it through slot 56.

Where the flap is rotatable the hinge should be located below the mean camber line of the wing section. This means that the radius of curvature of the upper surface just opposite the hinge is greater than one-half the thickness of the wing section at the hinge. The value of this radius should also have an absolute lower limit of 10 per cent of the chord length of the wing section.

In addition to having a wing of high mean camber it is desirable that its suction slots be located chiefly in the rear one-half of the wing. This arrangement will produce the greatest lift for the least expenditure of blower power.

The customary flap does not provide a sufficiently well rounded upper surface on a wing for efficient boundary layer control and this is particularly true for thin wings. Hence the type of flap or auxiliary wing here disclosed is of great importance to thin wings. In fact boundary layer control has not been successful heretofore on thin wings but the present invention makes it possible to attain as high maximum lifting capacity on thin wings as on thick.

Customary flaps have a chord length of 20 per cent of the wing chord and are deflected 60 degrees to obtain their maximum lifting effect. I find that with the well rounded upper surface provided by my invention the flap chord can be greatly increased preferably to 50 per cent and the angle increased to 90 degrees preferably. The desirable characteristics can be stated in terms of the product of the flap chord expressed as a fraction of the wing chord and the flap angle expressed in degrees. Thus the value of the product should be greater than 12.

Another feature of the flaps and/or auxiliary vanes I employ is that they are open along their leading edge for communication to the front body of the wing. This is difficult to do, especially for flaps which rotate through large angles. Yet it is an important feature, to provide for a sufficient volume of flow through the slot in the flap. If a small opening is used the suction or blowing pressure must be uneconomically high to provide a sufficient volume.

Even more important, a large opening extending along the span of the flap provides for a distributed flow through the slot which is very important for its effectiveness. If the opening were at one end of the flap it would have to be small and then the flow through the slot is apt to be chiefly through the portion of the slot near the said end. The easy and obvious place to have the opening is at the end of the flap. Then sealing presents no difficulty since the flap can rotate about the center of the duct communicating between the wing and the flap. I have gone contrary to this precedent and located the communication passage at the front of the flap and provided an effective means of doing it.

In the drawings the communication opening exists for the full length of the flap but it may be varied or suppressed at certain locations to change the flow through the slot. I have found that the area of the opening should be at least greater than one quarter of the area of the slot to be successful.

I have disclosed two types of flap arrangements suitable for ailerons or for lift augmentation. Either type may be used for either purpose.

A flap which varies the upper surface of the wing I call an upper surface flap. I use the term flap for any type of flap. I use the term "lift flap" to indicate the flap or flaps which are moved symmetrically on opposite sides of the vertical plane of symmetry of the aircraft to increase the lift. Flaps with differential motion are control flaps.

A point on the wing chord situated a distance in from either the leading or trailing edge equal to 10 per cent of the chord I call a 10 per cent point.

While I have illustrated certain specific forms of the invention it is to be understood that changes may be made without departing from the spirit of the invention and that I intend to claim my invention broadly as indicated in the accompanying claims.

I claim:

1. A wing structure comprising a wing main body the upper surface of which is defined by a curve of a radius longer than the maximum thickness of the wing, a lift flap portion having an upper surface defined by a curve of a radius greater than the thickness of the wing adjacent the end of said main body, the lower surface of said main body and of said flap being closed to through passage of air from the region below to the region above the wing in all relative positions of the wing and flap, means enclosed by said wing and flap for mounting said flap for adjustment about a radius of less length than the thickness of the wing at said end of the main body providing for changing its position with respect to said main body from a raised high speed position in alignment therewith forming a regularly curved lower airfoil surface to a lowered high lift position at a substantial angle with respect thereto, the forwardly projecting portion of said upper curved flap surface lapping the trailing end of said main body in the raised position of said flap, said forwardly projecting portion being movable into position closely adjacent the end of said main body exposing said curved upper surface thereof when the flap is in lowered position to provide a substantially continuous upper curved surface for said combined wing and flap of substantial radii.

2. A wing structure comprising a wing main body the upper surface of which is defined by a curve of a radius longer than the maximum thickness of the wing, a lift flap portion having an upper surface defined by a curve of a radius greater than the thickness of the wing adjacent the end of said main body, the lower surface of said main body and of said flap being closed to through passage of air from the region below to the region above the wing in all relative positions of the wing and flap, means enclosed by said wing and flap for mounting said flap for adjustment about a radius of less length than the thickness of the wing at said end of the main body providing for changing its position with respect to said main body from a raised high speed position in alignment therewith forming a regular curved lower airfoil surface to a lowered high lift position at a substantial angle with respect thereto, the forwardly projecting portion of said upper curved flap surface lapping the trailing end of said main body in the raised position of said flap, said forwardly projecting portion being movable into position closely adjacent the end of said main body exposing said curved upper surface thereof when the flap is in lowered position to provide a substantially continuous upper curved surface for said combined wing and flap of substantial radii, said combined upper curved surface of the wing and flap having a slot therein in communication with the interior of the wing, and means within the wing for causing a flow of air through said slot to increase the velocity of air flow in the boundary layer on said upper curved surface.

3. A wing structure comprising a wing main body the upper surface of which is defined by a curve of a radius longer than the maximum thickness of the wing, a lift flap portion having an upper surface defined by a curve of a radius greater than the thickness of the wing adjacent the end of said main body, the lower surface of said main body and of said flap being closed to through passage of air from the region below to the region above the wing in all relative positions of the wing and flap, means enclosed by said wing and flap for mounting said flap for adjustment about a radius of less length than the thickness of the wing at said end of the main body providing for changing its position with respect to said main body from a raised high speed position in alignment therewith forming a regularly curved lower airfoil surface to a lowered high lift position at a substantial angle with respect thereto, the forwardly projecting portion of said upper curved flap surface lapping the trailing end of said main body in the raised position of said flap, said forwardly projecting portion being movable into position closely adjacent the end of said main body exposing said curved upper surface thereof when the flap is in lowered position to provide a substantially continuous upper curved surface for said combined wing and flap of substantial radii, said combined upper curved surface of the wing and flap having a slot therein in communication with the interior of the wing in the high lift position of said flap, and blower means within the wing for inducting the boundary layer of said upper curved wing portion to increase the velocity of air flow thereover.

4. A wing structure comprising a wing main body the upper surface of which is defined by a curve of a radius longer than the maximum thickness of the wing, a lift flap portion having an upper surface defined by a curve of a radius greater than the thickness of the wing adjacent the end of said main body, the lower surface of said main body and of said flap being closed to through passage of air from the region below to the region above the wing in all relative positions of the wing and flap, means enclosed by said wing and flap for mounting said flap for adjustment about a radius of less length than the thickness of the wing at said end of the main body providing for changing its position with respect to said main body from a raised high speed position in alignment therewith forming a regularly curved lower airfoil surface to a lowered high lift position at a substantial angle with respect thereto, the forwardly projecting portion of said upper curved flap surface lapping the trailing end of said main body in the raised position of said flap, said forwardly projecting portion being movable into position closely adjacent the end of said main body exposing said curved upper surface thereof when the flap is in lowered position to provide a substantially continuous upper curved surface for said combined wing and flap of substantial radii, an auxiliary flap for closing and completing the continuous outer surface of said combined wing and flap, and means for adjustably mounting said auxiliary flap providing for movement thereof into closing relation as said lift flap is adjusted from one position to another.

5. A wing structure comprising a wing main body the upper surface of which is defined by a curve of a radius longer than the maximum thickness of the wing, a plurality of articulated lift flap elements arranged in tandem, each having an upper surface defined by a curve of a radius greater than the thickness of the preceding wing or flap section at the trailing ends thereof, the lower surfaces of said wing main body and of said flap elements being closed to through passage of air from the region below to the region above the wing in all relative positions of said wing and flaps, said lower surfaces in the raised position of said flaps being smooth and free of closed bottom recesses, means for hinging the foremost flap element to said main body substantially in the plane of the lower surface of said wing, means for hinging a succeeding flap element to the preceding flap element in substantially the plane of the lower surface thereof, each of said flap elements having a forwardly projecting portion of a curvature comparable with that of the normally exposed part of the upper curved surface of said flap and adapted to lap the rear end of the projecting section in the raised position thereof, means providing for lowering said flaps to respective positions where said forwardly projecting portions are brought against the ends of the respective preceding sections thereby providing an upper curved surface of substantial radius which is substantially continuous over said wing and flap elements.

6. A wing structure comprising a wing main body the upper surface of which is defined by a curve of a radius longer than the maximum thickness of the wing, a plurality of articulated lift flap elements arranged in tandem, each having an upper surface defined by a curve of a radius greater than the thickness of the preceding wing or flap section at the trailing ends thereof, the lower surfaces of said wing main body and of said flap elements being closed to through passage of air from the region below to the region above the wing in all relative positions of said wing and flaps, said lower surfaces in the raised position of said flaps being smooth and free of closed bottom recesses, means for hinging the foremost flap element to said main body substantially in the plane of the lower surface of said wing, means for hinging a succeeding flap element to the preceding flap element in substantially the plane of the lower surface thereof, each of said flap elements having a forwardly projecting portion of a curvature comparable with that of the normally exposed part of the upper curved surface of said flap and adapted to lap the rear end of the preceding section in the raised position thereof, means providing for lowering said flaps to respective positions where said forwardly projecting portions are brought against the ends of the respective preceding sections thereby providing an upper curved surface of substantial radius which is substantially continuous over said wing and flap elements, said combined upper curved surface of the wing and flap elements having at least one slot therein in communication with the interior of the wing, and blower means within the wing for causing a flow of air through said slot to increase the velocity of air flow in the boundary layer on said upper curved surface.

7. A wing structure comprising a wing main body the upper surface of which is defined by a curve of a radius longer than the maximum thickness of the wing, a lift flap portion having an upper surface defined by a curve of a radius greater than the thickness of the wing adjacent the end of said main body, the lower surface of said main body and of said flap being closed to through passage of air from the region below to the region above the wing in all relative positions of the wing and flap, means for mounting said flap for adjustment providing for changing its position with respect to said main body from a raised high speed position in alignment therewith forming a regularly curved lower airfoil surface to a lowered high lift position at a substantial angle with respect thereto, the forwardly projecting portion of said upper curved flap surface lapping the trailing end of said main body in the raised position of said flap, said forwardly projecting portion being movable into position closely adjacent the end of said main body exposing said curved upper surface thereof when the flap is in lowered position to provide a substantially continuous upper curved surface for said combined wing and flap of substantial radii, said combined upper curved surface of the wing and flap having a slot therein in communication with the interior of the wing, the forward end of said flap being open to provide direct communication and free flow of air through the wing interior, and means within the wing for causing a flow of air through said slot and the open end of said flap to increase the velocity of air flow in the boundary layer on said upper curved surface.

8. A wing structure comprising a wing main body the upper surface of which is defined by a curve of a radius longer than the maximum thickness of the wing, a lift flap portion having an upper surface defined by a curve of a radius greater than the thickness of the wing adjacent the end of said main body, means enclosed by said wing and flap for mounting said flap for adjustment about a radius of less length than the thickness of the wing at said end of the main body providing for changing its position with respect to said main body from a raised high speed position in alignment therewith forming a regularly curved lower airfoil surface to a lowered high lift position at a substantial angle with respect thereto, the forwardly projecting portion of said upper curved flap surface lapping the trailing end of said main body in the raised position of said flap, said forwardly projecting portion being movable into position closely adjacent the end of said main body exposing said curved upper surface thereof when the flap is in lowered position to provide a substantially continuous upper curved surface for said combined wing and flap of substantial radii, said combined upper curved surface of the wing and flap having a slot therein in communication with the interior of the wing, the forward end of said flap being open to provide direct communication and free flow of air through the wing interior, and means within the wing for causing a flow of air through said slot and the open end of said flap to increase the velocity of air flow in the boundary layer on said upper curved surface.

9. A wing structure comprising a wing main body the upper surface of which is defined by a curve of a radius longer than the maximum thickness of the wing, a lift flap assembly including a plurality of sections arranged in articulated tandem relation with respect to said wing main body, said lift flap sections having portions the upper surface of which is defined by a curve of a radius greater than the thickness of the immediately preceding wing structure, the lower surface of said main body and of said flaps being closed at the junctions therebetween to through passage of air from the region below to the region above the wing in all relative positions of the wing and flaps, means for mounting said flaps for adjustment providing for changing their position with respect to said main body from a raised high speed position in alignment therewith forming a regularly shaped lower airfoil surface to a lowered high lift position at a substantial angle with respect thereto, the forwardly projecting portion of said flap surfaces lapping the trailing end of the preceding wing structure in the raised position of the said flap, said forwardly projecting portions being movable into position closely adjacent the ends of the preceding wing structure exposing said curved upper surfaces thereof when the flaps are in lowered position to provide a substantially continuous upper curved surface for said combined wing and flaps of substantial radius, said combined upper surface of the wing and flap sections having a slot therein in communication with the interior of the wing, the forward end of the forward flap section being opened to provide direct communication and free flow of air through the wing interior, and means within the wing for causing a flow of air through said slot and the open end of said flap to increase the velocity of air flow in the boundary layer on said upper curved surface.

10. A wing structure comprising a wing main body the upper surface of which is defined by a curve of a radius longer than the maximum thickness of the wing, a lift flap assembly including a plurality of sections arranged in articulated tandem relation with respect to said wing main body, said lift flap sections having portions the upper surfaces of which is each defined by a curve of a radius greater than the thickness of the immediately preceding wing structure, the lower surface of said main body and of said flap sections being closed at the junctions therebetween to through passage of air from the region below to the region above the wing in all relative positions of the wing and flap sections, means for mounting said flap sections for adjustment providing for changing their position with respect to said main body from a raised high speed position in alignment therewith to a lowered high lift position at a substantial angle with respect thereto, the forwardly projecting upper portion of a said flap section lapping the trailing end of the preceding wing structure in the raised position of said flap, said forwardly projecting portion being movable into position closely adjacent the end of the preceding wing structure exposing the curved upper surface thereof when said flap sections are in lowered position to provide a substantially continuous upper curved surface for said combined wing and flap of substantial radius, said combined upper curved surface of the wing and flap having at least one slot therein in communication with the interior of the wing, the forward flap section having a communication passage therethrough for free flow of air through the wing interior, and means within the wing for causing a flow of air through said slot and said passage to increase the velocity of air flow in the boundary layer on said upper curved surface.

11. A wing structure comprising a wing main body the upper surface of which is defined by a curve of a radius longer than the maximum thickness of the wing, a lift flap assembly including a plurality of sections arranged in articulated tandem relation with respect to said wing main body, said lift flap sections having portions the upper surface of which is each defined by a curve of a radius greater than the thickness of the immediately preceding wing structure, the lower surface of said main body and of said flap sections being closed at the junctions therebetween to through passage of air from the region below to the region above the wing in all relative positions of the wing and flap sections, means for mounting said flap sections for adjustment providing for changing their position with respect to said main body from a raised high speed position in alignment therewith to a lowered high lift position at a substantial angle with respect thereto, the forwardly projecting portion of a said flap lapping the trailing end of the preceding wing structure in the raised position of said flap, said forwardly projecting portion being movable into position closely adjacent the ends of the preceding wing structure exposing the curved upper surface thereof when the flap sections are in lowered position to provide a substantially continuous upper curved surface for said combined wing and flap of substantial radius, said combined upper curved surface of the wing and said flap sections having a slot in said second flap section in communication with the interior of the wing, the forward end of the rear flap and both ends of the forward flap being opened to provide direct communication and free flow of air through the interior of the wing structure.

12. A wing structure as defined in claim 7 in which the lapping relationship between the flap surface and the end of the wing main body is provided by means of an auxiliary covering flap which forms a continuing convex upper surface contour when the lift flap is in raised high speed position.

13. A wing structure as defined in claim 10 in which the flow is inducted into the wing interior inwardly through said slot.

EDWARD A. STALKER.